United States Patent
Suter

[11] Patent Number: 5,098,318
[45] Date of Patent: Mar. 24, 1992

[54] ELECTRICAL CONTACT ASSEMBLY

[75] Inventor: Ernst Suter, Koelliken, Switzerland

[73] Assignee: Sprecher Energie AG, Oberentfelden, Switzerland

[21] Appl. No.: 683,045

[22] Filed: Apr. 10, 1991

[30] Foreign Application Priority Data

Apr. 10, 1990 [CH] Switzerland ............... 1225/90

[51] Int. Cl.⁵ ............................................. H01R 4/48
[52] U.S. Cl. .................................. 439/819; 200/255; 439/251
[58] Field of Search ........................ 439/816–819, 439/823, 833, 839, 786, 786, 794, 723, 729, 246–249, 251; 200/255, 282

[56] References Cited

U.S. PATENT DOCUMENTS

| | | | |
|---|---|---|---|
| 2,376,818 | 5/1945 | Rubel | 439/247 |
| 2,872,659 | 2/1959 | Wills | 439/819 |
| 3,201,556 | 8/1965 | Baird | 200/166 |
| 3,427,419 | 2/1969 | Findley, Jr. | 200/166 |
| 4,486,636 | 12/1984 | Prietzel et al. | 200/255 |
| 4,534,612 | 8/1985 | Loegstrup et al. | 439/819 |

FOREIGN PATENT DOCUMENTS 107611 5/1984 European Pat. Off.
2594604 9/1987 France ............... 439/787

Primary Examiner—David L. Pirlot
Attorney, Agent, or Firm—Fleit, Jacobson, Cohn, Price, Holman & Stern

[57] ABSTRACT

An electrical contact assembly has a contact carrier formed with symmetrically opposed rows of comb-like guides, opposed rows of double-ended contact fingers mounted in the guides, a first contact piece supported by the contact carrier between the contact fingers at one end of the fingers and a second contact piece for insertion between the contact fingers at the opposite end of the fingers. For resiliently urging the fingers to contact the respective contact pieces, a pair of spring elements are attached to the contact carrier. Each spring element has a central web mounted on the carrier and opposite rows of arms extending from the web to engage opposite portions of the respective fingers.

12 Claims, 3 Drawing Sheets

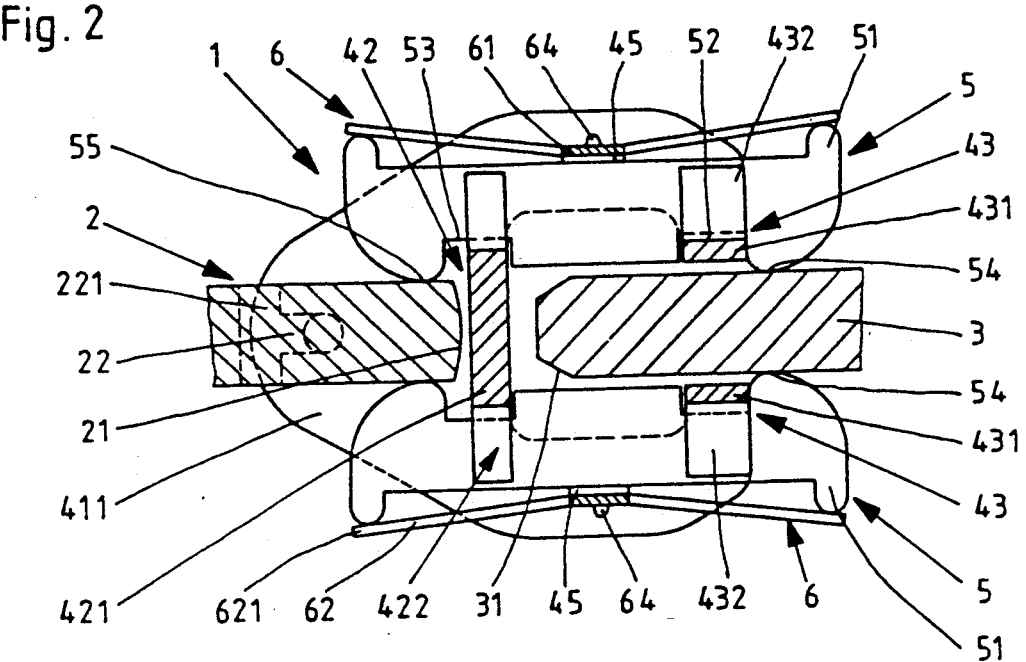
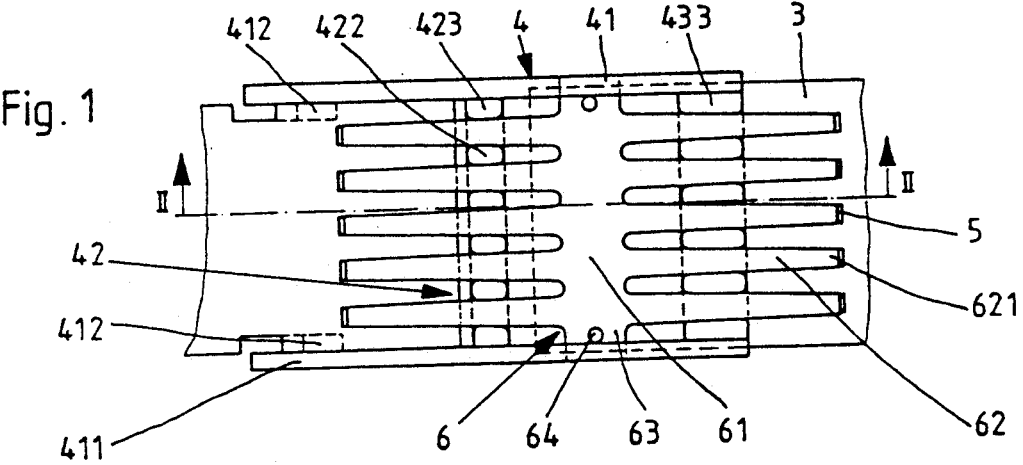
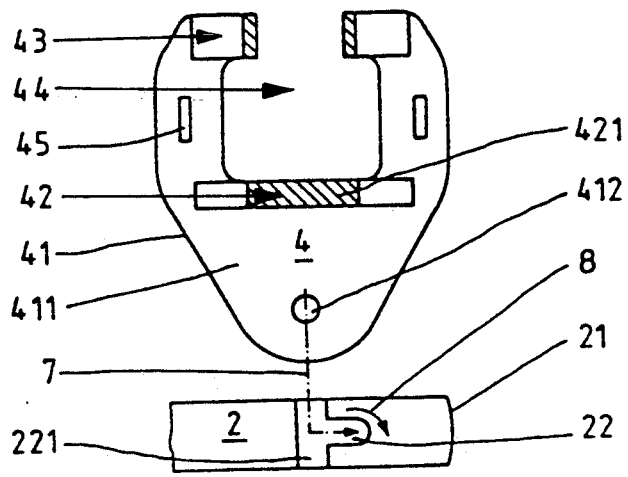

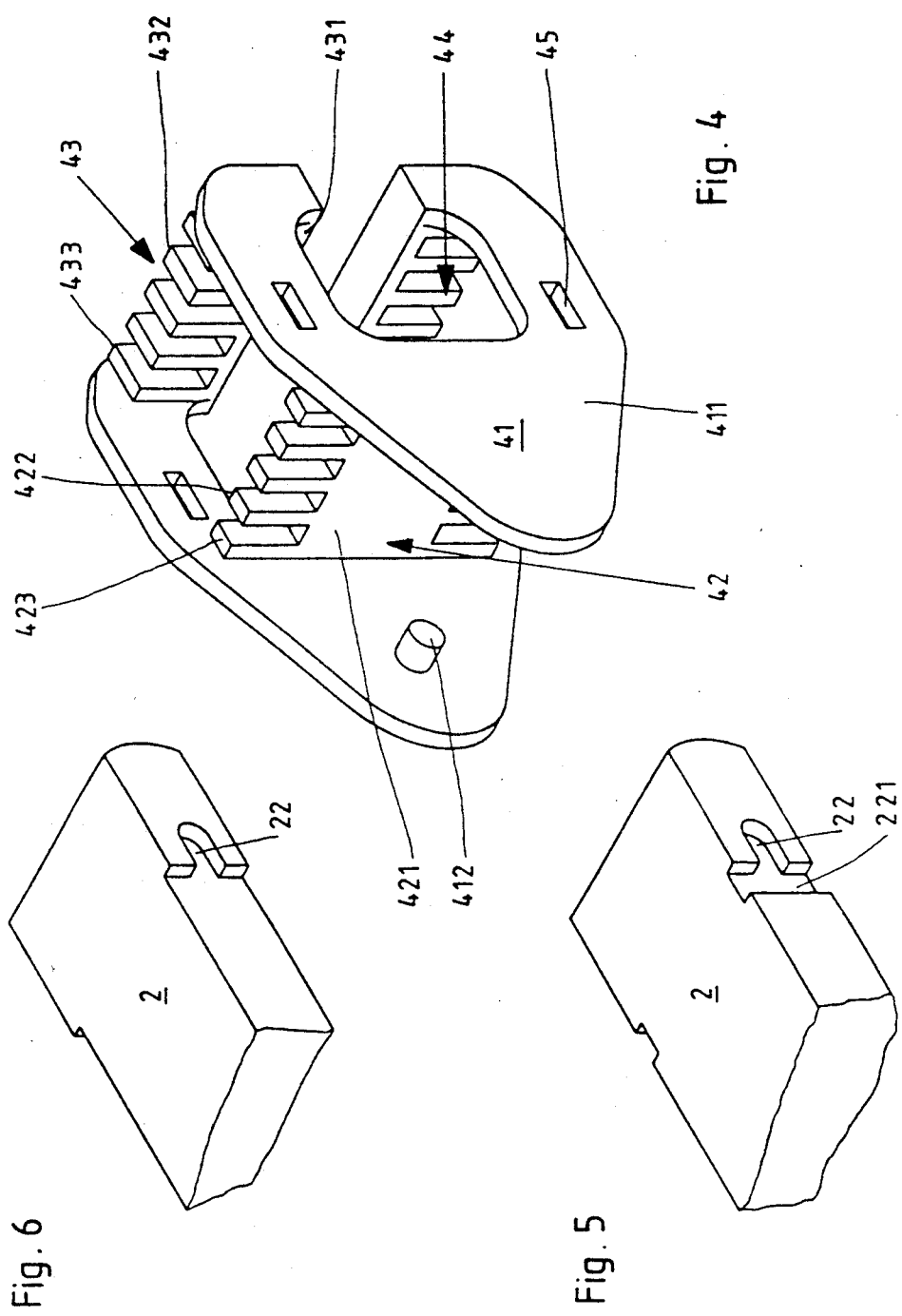

ELECTRICAL CONTACT ASSEMBLY

BACKGROUND OF THE INVENTION

This invention relates to an electrical contact assembly, particularly for switchgear assemblies with withdrawable switchgear. The arrangement is of a type typically having two contact pieces, which can be moved relative to one another, and which have a rectangular cross-section at least at their ends facing one another. One of the contact pieces is connected in an articulated manner to a contact carrier in which two rows of individually sprung contact fingers are mounted symmetrically with respect to a central plane. The contact fingers electrically connect the one contact piece to the other contact piece when it is plugged into the assembly. The contact fingers of one row embrace from outside at least one guide comb which has a web and, protruding therefrom, spacing elements which space the contact fingers apart from one another, and which is produced integrally with the contact carrier.

A contact assembly of the above type is disclosed in U.S. Pat. No. 3,427,419. The contact carrier consists in this arrangement of a plate bent in a U-shape, the base of which is provided on both sides with indentations and thus forms a guide comb. In each case, one pair of contact fingers engages in an indentation and is thus spaced apart from the neighboring pair. In each case two mutually facing pairs of contact fingers are tensioned with respect to one another by a screw spring with clips. The clips also serve for spacing the contact fingers of a pair apart from one another. At one end, the contact fingers are provided with a hole. A guide bolt which additionally secures the fingers is loosely plugged through the holes of all the contact fingers of one row. At this end of the contact fingers, a multiply bent wire spaces the pairs of contact fingers apart from one another. This contact arrangement consists of a large number of individual parts. In addition to the two contact pieces, the contact carrier and the contact fingers, in each case two guide bolts and wires, four contact fingers, one contact pressure spring and two bolts and clips are required. The assembly of the contact arrangement is therefore costly.

A further contact assembly is disclosed in EP-A1 0 107 611. In this contact arrangement, the guide combs each consist of a punched plate, the center piece of which, bent in a U-shape, with projections, is connected to the sidewalls of the contact carrier. Arms which extend at an acute angle between the contact fingers and form the spacing elements extend from the legs of the center piece which is bent in a U-shape. The contact fingers embrace, with a recess, the U-shaped center part of the guide comb and are thus secured against axial displacement. The contact fingers penetrate the rectangular frame formed from the sidewalls of the contact carrier and of the guide combs, that is to say they embrace the guide combs from inside. In the non-plugged-in state of the contact arrangement, in each case two mutually facing contact fingers abut against one another. In this arrangement, the contact carrier must therefore be assembled from a plurality of parts since it is not possible with the ready-mounted contact carrier to install or remove contact fingers. In each row of fingers there is only a single spring element which is punched out of metal plate and stamped and consists of a central web and arms, the ends of which rest on the ends of the contact fingers, extending therefrom The spring element is supported by the central web on a crosspiece of the contact carrier. This arrangement also consists of a large number of individual parts, namely two spring elements and a contact carrier consisting of six parts (in each case two sidewalls, guide combs and crosspieces), in addition to the two contact pieces and the contact fingers. Mounting is also costly since the contact carrier cannot be fully assembled until the contact fingers have been inserted.

In U.S Pat. No. 3,201,556 a contact assembly is disclosed which has one integral spring element per row of contact fingers. The contact fingers of one row, however, abut against each other so that they cool badly and cannot be move independently of one another. The contact body embraces the spring elements. The latter must therefore be laboriously inserted axially when mounting.

SUMMARY OF THE INVENTION

An object of the present invention is to provide a contact assembly which consists of a minimum number of parts, which is easy to mount and which is therefore economical to manufacture.

In accordance with the invention, an integral spring element having a central web and rows of oppositely directed arms extending therefrom is used to spring mount respective rows of contact fingers on a contact carrier.

The webs of the spring elements are preferably extended at their ends by tongues which engage in openings in the contact carrier. In a preferred embodiment, the openings in the contact carrier are rectangular and the tongues are provided with impressed bosses which abut against the edge of the rectangular openings and thus secure the spring element against displacement in the direction of the central web.

In another preferred embodiment, the tongues of the spring elements have a shoulder at their ends and the openings in the contact carrier have the shape of two mutually abutting rectangles of different width, which correspond to the widths of the tongues on opposite sides of the shoulder, the shoulders securing the spring element against displacement in the direction of the central web by abutting against the edge of the narrower part of the openings.

Advantageously, the central webs of the spring elements are narrower at their ends than in the center and the outer arms of the spring elements are correspondingly longer than the inner arms.

The contact carrier preferably consists of two plane sidewalls and at least two guide combs which connect the sidewalls to one another.

The sidewalls of the contact carrier on the side facing the mating contact piece in a preferred embodiment are cut out in a U-shape. Each guide comb connects the sidewalls at the two ends and at the base of the U-shape.

The contact carrier is preferably manufactured from metal by diecasting.

The invention is explained in greater detail below with reference to figures, in which:

BRIEF DESCRIPTION OF DRAWINGS

FIG. 1 is a plan view of a contact assembly according to the invention,

FIG. 2 is a sectional view on line II—II in FIG. 1,

FIG. 3 is a sectional elevation of a contact carrier of the contact assembly and an associated contact piece, shown in positions relative to one another at the start of mounting, FIG. 4 is a perspective view of the contact carrier, FIG. 5 is a perspective view of the contact piece, FIG. 6 is a perspective view of a different embodiment of the contact piece.

DESCRIPTION OF PREFERRED EMBODIMENTS

Figure 7:
FIGS. 7 and 8 are an elevation and plan view of a spring element of the contact assembly.

FIGS. 1 and 2 show a contact assembly 1 according to the invention in a plugged-in position. It connects the two contact pieces 2 and 3 to one another. The first contact piece 2 is connected, for example, to a terminal of a movable power switch and the mating contact piece 3 is connected to the bus bar or to the outgoing circuit of a switchgear assembly. By means of horizontal displacement, the power switch can be separated from the bus bar or the outgoing circuit. This can be done by un-plugging the mating contact piece 3 by withdrawing same from between opposed contact fingers 5.

The contact assembly 1 consists, in addition to the two contact pieces 2, 3, of a contact carrier 4, two rows of the contact fingers 5 and two spring elements 6.

The two contact pieces 2, 3 and the contact fingers 5 consist of material with good conductive properties, such as copper, and are preferably silverplated at least in the region of their contact points. The contact carrier 4 is preferably manufactured from metal by diecasting, but can also be made of thermoplastic or duroplastic In the area of the contact assembly 1, the two contact pieces 2, 3 have a rectangular cross-section. The end 21 of the first contact piece 2 is slightly rounded-off and the end 31 of the mating contact piece 3 is beveled.

As can be seen in particular from FIG. 4, the contact carrier 4 consists of two sidewalls 41. These each have one cutout 44 on the side facing the mating contact piece 3, so that the sidewalls 41 assume the shape of a U. Due to the cut-out 44, the contact arrangement 1 can also receive mating contact pieces 3, the width of which is greater than the spacing between the sidewalls 41. Misalignments of the contact pieces 2, 3 can thus be tolerated. The sidewalls 41 are connected to one another at the base of the cut-out 44 by means of a web 421 and at the edges of the cut-out 44 by means of two further webs 431. These webs carry spacing elements 422, 432 which form, together with the webs 421, 431, guide combs 42, 43 for the contact fingers 5. Further spacing elements 423, 433 space the contact fingers 5 from the sidewalls 41. Due to the spacing elements 422, 423, 432, 433, the contact fingers 5 are spaced apart with respect to one another and with respect to the sidewalls 41. They are thus well cooled by the surrounding air and the contact pressure of the contact fingers 5 is not influenced by frictional forces acting between the contact fingers.

The contact fingers 5 (FIG. 2) are of symmetrical construction. On one longitudinal side they each have a projecting contact point 54, 55 in the region of the ends, and between said points two rectangular indentations 52, 53. The indentation 52 embraces one of the webs 431 with a small degree of axial play. As a result, axial displacement of the contact fingers 5 in relation to the contact carrier 4 is prevented. The indentation 53 embraces the web 421 with a greater degree of play. On the other longitudinal side, the contact fingers 5 have a bulb 51 at each end.

Figure 8:
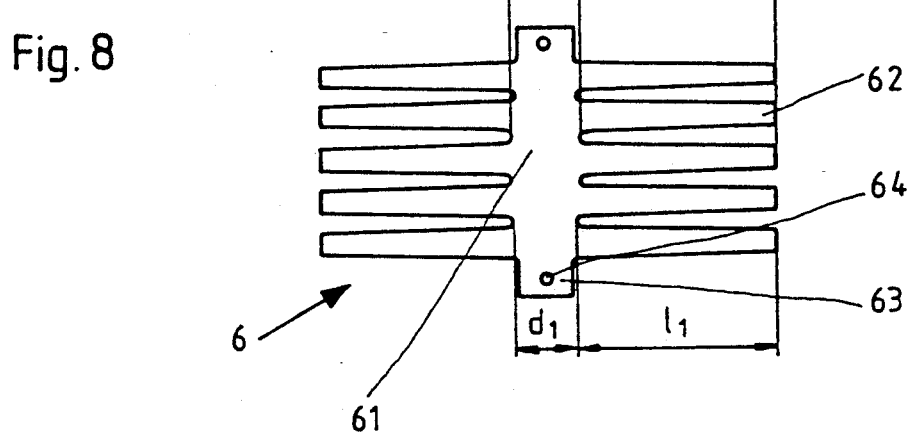

The contact pressure of all the contact fingers 5 is generated on each side by a single spring element 6 (FIGS. 7 and 8). The spring element is punched from a flat plate of resilient material and consists of a central web 61 and opposite rows of arms 62 which project therefrom on both sides in a comb-like manner. The ends 621 of the arms 62 each lie on a bulb 51 of one contact finger 5. The central web 61 is extended on opposite sides by tongues 63 which engage in rectangular openings 45 in the sidewalls 41 of the contact carrier 4. Impressed in the vicinity of the ends of the tongues 63 are bosses 64 which abut against the sidewalls 41 and thus prevent the spring elements 6 being displaced transversely with respect tot he contact fingers 5.

On loading of the arms 62 (as in FIG. 1), the central web 61 is slightly bent. The spring force acting on the central contact fingers 5 is therefore somewhat smaller than that acting on the outer contact fingers 5. This difference can be compensated as shown in FIG. 8, by making the width $d_1$ of the central web 61 at its ends somewhat smaller than the width $d_2$ of the web in the center and by making the length $l_2$ of the outer arms 62 of the spring elements 6 correspondingly longer than the length $l_2$ of the inner arms.

On the side facing away from the mating contact piece 3, the sidewalls 41 of the contact carrier 4 form two legs 411 which project over the web 42 and embrace the first contact piece 2 (FIG. 4). A pin 412 is seated on each of the mutually facing inner sides of these legs 411.

Grooves 22 are milled onto the narrow sides of the first contact piece 2 (FIG. 5). The width of the grooves 22 corresponds to the diameter of the pins 412. The grooves 22 are closed in the direction of the mating contact piece 3, and in the opposite direction they lead into transverse grooves 221 which ar open on both sides. Alternatively, the transverse grooves 221 can be closed on one side, or the width of the first contact piece 2 can be reduced at the end of the grooves 22 facing away from the mating contact piece 3 (FIG. 6), so that the grooves 22 are open at this end.

In order to mount the contact arrangement 1 on the first contact piece 2, the contact carrier 4 is placed in the position shown in FIG. 3, that is to say with its plane of symmetry in a plane through the pivot axis perpendicular to the longitudinal axis of the first contact piece 2. The contact carrier 4 is then displaced in accordance with arrow 7 in such a way that the pins 412 are introduced into the grooves 22 until the pins 412 come to rest at the closed end of the grooves 22. The contact carrier 4 is subsequently turned down in accordance with arrow 8 through 90° in a clockwise direction into the normal operating position. The web 42 is then located directly in front of the end 21 of the first contact piece 2 and thus prevents the pins 412 from being removed backwards out of the grooves 22.

The contact fingers 5 are now inserted, initially on one side, and secured with the spring element 6, initially one tongue 63 being introduced into the corresponding rectangular opening 45, pressure then being exerted on the central web 61 so that the other tongue 63 can be introduced into its associated rectangular opening 45 until the bosses 64 engage between the sidewalls 41.

Then, the contact fingers 5 on the other side are inserted in the same way.

The contact fingers 5 rest (with the mating contact piece 3 not yet plugged in) with their indents 52 on the other webs 431. The contact points 54 of the opposed contact fingers 5 are therefore spaced apart form one another, which makes the introduction of the mating contact piece 3 easier. In addition, the spring elements 6 contain a considerable degree of prestressing and press the contact fingers 5 at the contact points 55 onto the first contact piece 2 with a large degree of force, as a result of which a centering effect is produced. The inserted contact fingers 5 secured with the spring element 6 limit the angle through which the contact carrier 4 can be swiveled about the pins 412 so that the web 421 always abuts against the end 21 of the first contact piece 2 and the pins 412 in the grooves 22 cannot be displaced. As a result, it is difficult to detach the contact carrier 4 from the first contact piece 2.

Figure 9:
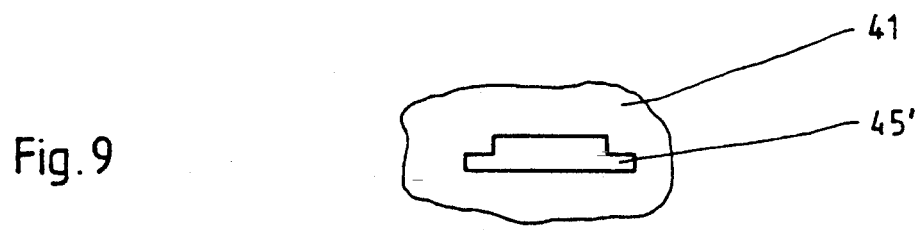
FIG. 9 is a detail view of a different embodiment of the contact carrier and FIG. 10 is a detail view of a spring element for the embodiment shown in FIG. 9.
Figure 10:
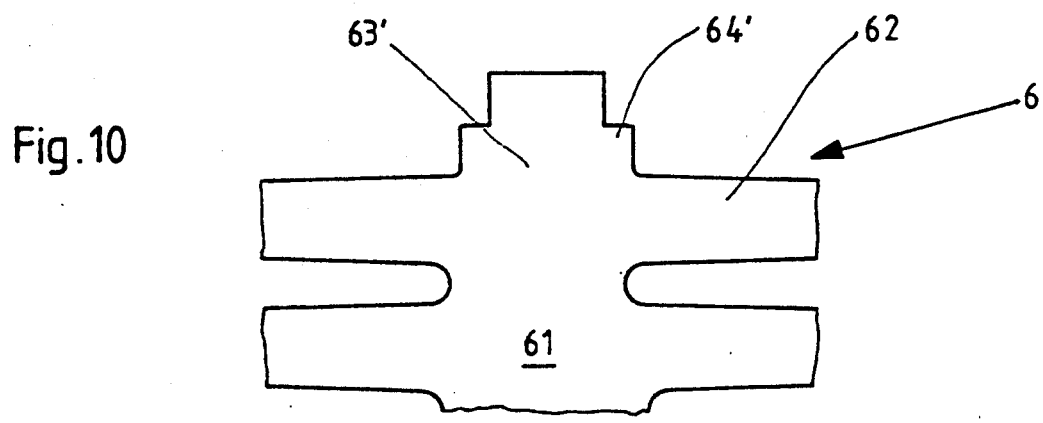

In FIGS. 9 and 10, a further embodiment of the fastening of the spring element to the contact carrier 4 is shown. The tongues 63' (FIG. 10) of the spring elements 6 each have a shoulder 64' at their ends. The openings 45' (FIG. 9) in the contact carrier 4 have the shape of two mutually abutting rectangles of different widths. These widths correspond to the widths of the tongues 63' on either side of the shoulder 64'. The spring element 6 is secured against displacement in the direction of the central web 61 by the abutting of the shoulders 64' against the edge of the narrower part of the openings 45'. This embodiment has the advantage that the spring element 6 can be manufactured by a single punching process, whereas in the embodiment according to FIGS. 7 and 8 the bosses 64 have to be impressed after punching.

The contact assembly according to the invention consists, excluding the two contact pieces 2, 3, of only three kinds of parts, namely a contact carrier 4, a number of contact fingers 5 and two spring elements 6. Further parts such as fastening elements, screws, bolts or split pins are not required.

I claim:

1. An electrical contact assembly comprising a contact carrier having integral symmetrical opposed rows of comb-like guides, opposed rows of double-ended contact fingers mounted in the respective guides, a first contact piece supported by the contact carrier between the contact fingers at one end of the fingers, a second contact piece for insertion between the contact fingers at an opposite end of the fingers, each of said guides comprising a base and a row of spacing elements extending outwardly from said base, the fingers having central portions between the respective ends of the fingers, said central portions being located between respective spacing elements of the comb-like guides outside of the respective bases relative to the contact pieces, and a pair of spring elements mounted on the carrier each for resiliently urging a respective row of the fingers to contact the respective contact pieces, each spring element comprising a central web mounted on the carrier and opposite rows of arms extending from the web to engage opposite portions of the respective fingers.

2. The invention as claimed in claim 1 wherein the web of each spring element has a wider central portion and narrower end portions and the arms are correspondingly longer at end portions of the spring element than at a central portion thereof.

3. The invention of claim 1 wherein the contact carrier is a diecasting.

4. The invention of claim 1 wherein the contact carrier is a metal fabrication.

5. The invention of claim 1 wherein the first contact piece has an articulated connection with the contact carrier.

6. The invention as claimed in claim 1 wherein the web of each spring element has a tongue at each end engaging in an opening in an end wall of the carrie to mount the element on the carrier.

7. The invention as claimed in claim 6 wherein each tongue is formed with a protruding boss abutting said wall and securing the spring element against displacement lengthwise of the web.

8. In an electrical contact assembly comprising a contact carrier having symmetrically opposed rows of comb-like guides, opposed rows of double-ended contact fingers mounted in the respective guides, a first contact piece supported by the contact carrier between the contact fingers at one end of the fingers, and a second contact piece for insertion between the contact fingers at an opposite end of the fingers, the improvement comprising a pair of spring elements mounted on the carrier each for resiliently urging a respective row of the fingers to contact the respective contact pieces, each spring element comprising a central web mounted on the carrier and opposite rows of arms extending from the web to engage opposite portions of the respective fingers, wherein the web of each spring element has a tongue at each end engaging in an opening in an end wall of the carrier to mount the element on the carrier, and wherein the opening has a form of two superposed rectangles of different widths and the tongue has spaced shoulders abutting the wall at opposite ends of one of the rectangles which is of smaller width thereby securing the spring element against displacement lengthwise of the web.

9. The invention as claimed in claim 1 wherein the carrier comprises two side walls and, between the side walls, at least two of the comb-like guides.

10. The invention of claim 9 wherein the carrier includes two spaced comb-like guides for each row of the fingers.

11. The invention as claimed in claim 9 wherein the side walls define a cut-out at one end of the carrier for admission of the second contact piece, the cut-out being bounded by opposed rows of said guides.

12. The invention as claimed in claim 11 wherein the side walls define a space therebetween at an opposite end of the carrier and mounting means for receiving the first contact piece in said space.

* * * * *